April 22, 1952   D. M. DOLTON ET AL   2,593,996
OPTICAL DENSITY COMPARATOR
Filed Dec. 23, 1948

INVENTORS.
DOROTHY M. DOLTON
DANIEL SMITH
BY

UNITED STATES PATENT OFFICE 2,593,996

OPTICAL DENSITY COMPARATOR

Dorothy M. Dolton, New York, and Daniel Smith, Riverdale, N. Y., assignors to Interchemical Corporation, New York, N. Y., a corporation of Ohio Application December 23, 1948, Serial No. 67,022

2 Claims. (Cl. 88—14)

This invention relates to instruments for determining the optical density of transparent or translucent materials.

The object of the invention is to provide improved means of measuring the density of transparent or translucent materials for radiation of selected wavelengths in order to identify, standardize, analyze, or compare them.

For the purpose of the herein disclosed invention we employ a source of light which is discontinuous with respect to wavelength distribution of energy. Light sources such as a mercury discharge lamp, argon or neon tubes, or a light source emitting the yellow radiation of sodium, as well as hydrogen and helium tubes, may be utilized as the source of radiant energy. They are characterized by emitting radiation only at certain wavelengths of the spectrum. In combination therewith we use filters which transmit a relatively narrow range of the spectrum. This enables us to confine the emergent radiation to a single wavelength in some instances or to narrow wavelength bands in some others.

In conjunction with the light source and the said filters we provide means whereby the emitted radiation is diffused and the material to be tested is placed in the path of the uniform radiation. Liquids, for instance, are placed in an absorption cell of predetermined internal optical depth. The radiation emergent from the liquid is observed through an aperture. In order to test transparent or translucent solid materials, after reducing them to proper size they are placed in the opening which otherwise admits the absorption cell. The intensity of the radiation is modified by the optical density of the transmitting material.

A second path of light, originating from the common source, and adjacent to the path of light transmitted through the sample, is observed by means of another aperture of the same diameter. This second aperture serves as a comparison field and is provided with means whereby the intensity of the transmitted radiation can be modulated. Such modulating means may consist of a neutral density wedge, or of two polarizing disks, or a set of Nicols which permit changes of the transmitted light intensity in the known manner. Neutral density wedges are made by coating glass plates with dyed gelatin or by inserting between glass plates a dyed film which varies in thickness from zero at one end to a maximum at the other end. By moving a calibrated wedge of this type across the comparison field, the transmitted light intensity can be modulated until it is equal to the intensity of the radiation transmitted by the sample. The optical density of the sample may then be calculated from the calibration of the wedge. When employing sheets of polarizing material or Nicols the change in light intensity is produced by rotating the analyzer with respect to the polarizer. The density may then be computed from the angle of rotation.

In examining a sample in this manner the optical density thereof is determined with respect to radiation of one single wavelength, or a narrow wavelength band, depending upon the kind of source of discontinuous radiation and the kind of filter. While the determination of the optical density at one specific wavelength of light will suffice in most cases, in some instances it will be desirable to determine the density of the material at several wavelengths of light. This can easily be accomplished by changing the filter, or by switching to a different source of discontinuous radiation and by employing the appropriate filters therewith.

In visually comparing the optical densities of samples, the use of monochromatic light is no absolute requirement. It is entirely satisfactory to use a wavelength band sufficiently narrow so that the visual hue difference that may exist between the sample and standard are no longer visible. The hue differences which would have a detrimental psychological influence upon the visual comparison of optical densities is thus as effectively eliminated as if the visual comparison were made under monochromatic light.

A list of discontinuous light sources together with the appropriate filters to obtain monochromatic or narrow band radiation of specific wavelengths is given in the following tabulation which is provided to illustrate, but not to limit the scope in any manner.

| Light source | Filters | Wavelength $M\mu$ |
|---|---|---|
| mercury | Corning {#3,060, #4,308, #5,970} | 405 and 408 |
| mercury | Wratten #50 | 436 |
| helium | Corning {#3,387, #5,113} (½ Std. T.) | [1] 469 |
| neon | Wratten {#4, #64, #32} | [1] 480 |
| mercury | Wratten {#15, #44} | 546 |
| mercury | Wratten {#57, #22} | 578 |
| sodium | Wratten #23 | 589 |
| hydrogen | Wratten #29 | 656 |
| mercury | Wratten #29 | [1] 690 |

[1] Predominant wavelength.

Appropriate filters can be identified and selected according to their spectrophotometric characteristics and we refer, in this connection, to a report by the Colorimetry Committee of the Optical Society of America, entitled "Quantitative Data and Methods for Colorimetry," J. Opt. Soc. Am., 34, 648–556, 1944; to an article by D. L. MacAdam, "Colorimetric Specification of Wratten Light Filters," J. Opt. Soc. Am., 35, 670–675; to a booklet by the Eastman Kodak Co., Rochester, N. Y., "Wratten Light Filters," and to a booklet by the Corning Glass Works, Corning, N. Y., "Glass Color Filters."

Although the herein disclosed instrument is primarily intended for a method of visually measuring the optical density of transparent and translucent materials or for comparing optical densities without interference by hue differences between two samples or between a sample and a standard, the practical use of the instrument is by no means limited thereto. Thus, by using a source of energy in the ultraviolet in conjunction with appropriate filters the device can be employed, for instance, to quantitatively compare the intensity of fluorescence or the excitation of phosphors.

The filter which selects one single wavelength or a narrow wavelength band from the heterochromatic radiation of the discontinuous light source can be inserted anywhere between the light source and the eye of the observer. However, as can be seen from the drawing and from the detailed description of one embodiment of the invention, we prefer to place the filter underneath the sample and thus make it less accessible and less subject to impairment or damage. This position below the sample cell is a necessity in the evaluation of fluorescence.

In testing the optical density of liquid, the reflectances at the glass-air and glass-liquid interfaces of the absorption cell reduce the amount of transmitted light. In order to compensate for this reduction, it is desirable to pass the radiation observed in the comparison field through an identical absorption cell filled with the solvent only.

An illustrative embodiment of the invention is shown in the accompanying drawing in which.

Figure 1:
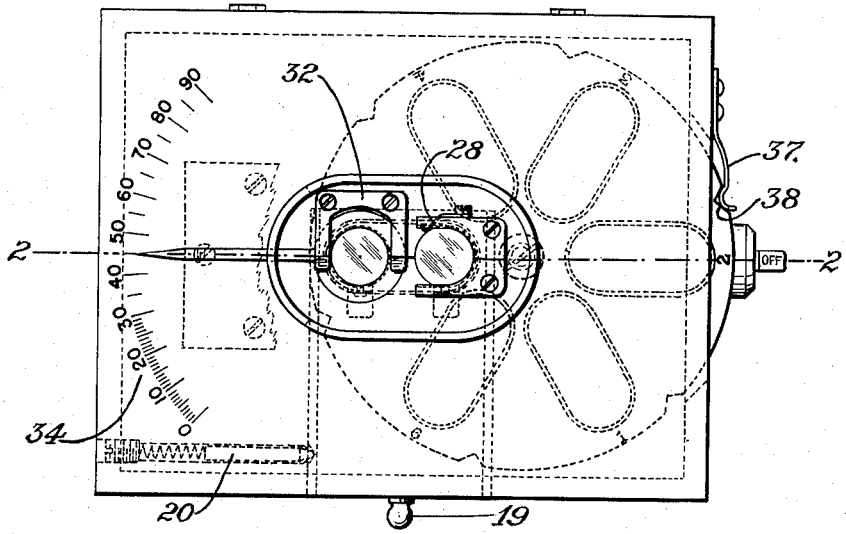
Fig. 1 is a plan view of one embodiment of the herein claimed instrument.
Figure 2:
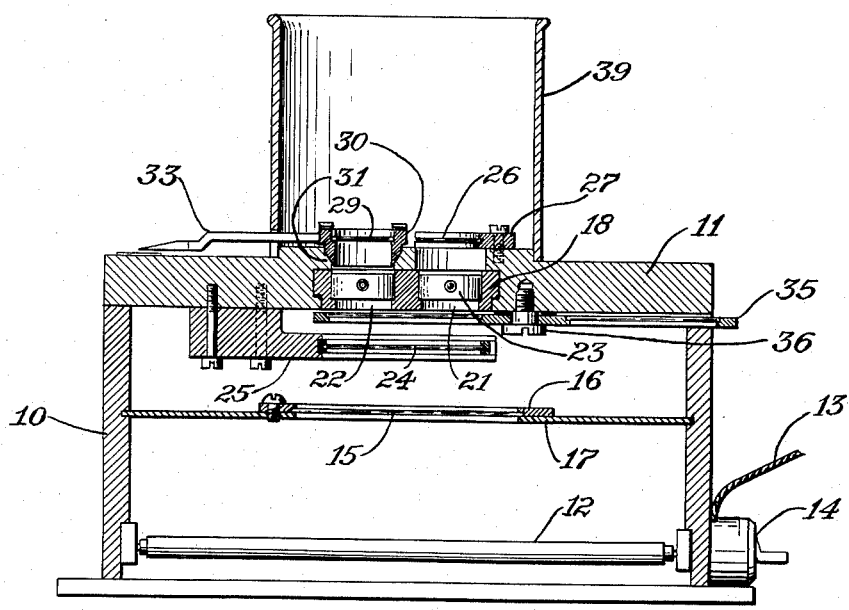
Fig. 2 is a sectional view of the instrument in side elevation along the line 2—2, Fig. 1.

Referring in detail to the construction shown in the drawing, the instrument comprises a case 10 having the usual sides and bottom and the hinged top 11. The inside of the case is preferably covered with a coat of flat white paint. A source for discontinuous radiation, say, a mercury discharge lamp 12, is mounted near and parallel to the bottom of the case. By means of the cord 13 the lamp can be connected with a plug and put in operation by means of the switch 14. It is to be understood that the invention contemplates and includes the alternative use of a plurality of sources for discontinuous light so that, with the aid of different filters, numerous monochromatic or narrow wave-length bands of radiation can be employed.

Within the case and appropriately above the light source a diffusing glass 15 is inserted to provide uniform and equal illumination at the sample and the standard apertures. As shown in the present embodiment the diffusing glass is held by means of the frame 16 over a circular opening in the center of the shield 17, but the diffusing glass may be cut to the dimensions of the case and placed over the light source without the aid of a shield.

According to the invention, the intensity of light having passed through a sample of the material to be analyzed is to be compared with the intensity of light having passed through a standard. For this purpose the herein illustrated embodiment provides a sliding frame 18 which fits into a suitable cut made in the top of the case. By means of the knob 19 the frame can be pulled out and reinserted in the case where it is held in position by means of the spring detent 20. Two adjacent circular openings in the frame serve as cell holders. The openings are recessed for this purpose and preferably extended in front to facilitate the easy insertion and removal of the sample and the blank. The cell holder 21 serves as carrier for the sample while the cell holder 22 is to serve as carrier for the blank if a blank is required. If fluid sample is to be tested, it is filled into the absorption cell 23 which is then inserted in the cell holder provided therefor. In the case of liquid sample, although it is not an absolute requirement, it is advantageous to fill an identical cell with the solvent and insert it in the space provided for a blank in order to compensate for any decrease in transmittance caused by glass-air and glass-liquid interface of the cell containing the sample, and by solvent absorption.

In the herein illustrated embodiment the use of sheets of polarizing material is proposed for modulating the light intensity of the standard. For this purpose and in order to attain comparability, both the sample and the standard are placed between sheets of such material. The sheet of polarizing material 24, which is of sufficient size to serve as polarizer for both the sample and the standard beam, is placed in the path of oncoming light and held there by means of the frame 25. Individual analyzer elements are provided for the sample and for the comparison field. The analyzer element for the sample, consisting of a sheet of polarizing material 26, is mounted in the frame 27 in such a manner that it is set at maximum light intensity with respect to the polarizer. It is held in this position by means of the spring 28. This arrangement facilitates the removal or the turning of the said analyzing element in order to make zero corrections. The analyzer element for the comparison field, consisting of the sheet of polarizing material 29, can be rotated so that by changing the position with respect to the polarizer the light intensity can be varied until it is equal to the intensity of the light emerging from the sample. For this purpose the said element is set into the floating mounting 30 which is rotatably fitted into the socket 31. The floating mounting is kept positioned in the socket and is made to resist turning forces to some extent by means of the pressure exerted upon it by the leaf spring 32. Attached to the floating mounting is the pointer 33 by means of which the disk of polarizing material is turned. This analyzer is set with respect to the polarizer so that the amount of light transmitted is a maximum with the pointer at zero position on the protractor scale 34 while no light is transmitted when the pointer is set at 90°.

For the analysis of samples such as dilute suspensions, which may cause a partial depolarization of the light by scattering, it is advisable to place the polarizing sheet above the absorption cells, directly under the two analyzers.

The sheets of polarizing material may be replaced by a set of Nicols or a calibrated neutral density wedge may be used in place thereof. By sliding the wedge across the comparison field the light intensity can be varied until it is equal to the intensity of the light emerging from the sample. In order to obtain uniform intensity across the entire comparison field, a balancing wedge consisting of a short wedge in reverse position is preferably inserted between the comparison field and the measuring wedge.

As an additional element a filter is required which selects one monochromatic or a specific narrow wavelength band radiation from the multiple wavelength radiation of the discontinuous light source. In a dark room or in subdued light, in following our invention the observer may simply hold the selected filter between his eye and the illuminated apertures of the sample and the standard. However, we find it more practical to have a plurality of different filters (as indicated by the numerals 1 to 6 inserted into the wheel 35 which is rotatably held by the pivot 36, in such a manner that one part of the wheel cuts through the path of light emerging from the analyzer. This arrangement facilitates the change from light of one wavelength or of one narrow wavelength band to another and enables a rapid determination of the optical density of the sample for radiations of different wavelengths. The filters inserted into the wheel are oblong and of sufficient size to serve both the sample and the standard beam. In order to hold them in the path of light the spring 37 is provided. With every part turn of the wheel which puts another filter in the proper position, the spring clicks into a notch, such as the notch 38, cut into the periphery of the wheel.

The use of more than, say, six different filters may be required in conjunction with employing a plurality of sources of discontinuous light. By mounting two of the described wheels one above the other, inserting five filters into each wheel and leaving one opening blank, a choice of 10 different filters is possible. In this case the symbols identifying the different frames are preferably placed onto the rim of the wheels. In any instance the symbols visible on the protruding parts of the wheels should not identify the nearest frame, but the opposite frame located in the path of light.

According to the herein disclosed embodiment, a suitable observation tube 39 is placed over the apertures to exclude stray radiation. The observation tube is preferably oval shaped and of such dimensions that it fits the eye distance of the average observer. A slot extending about 90 degrees at the base of the observation tube adjacent to the protractor scale permits operation of the pointer.

For a more convenient observation, the top of the instrument is preferably mounted in an inclined position onto the sides of the case in such a manner that the observation tube slants toward the observer.

While one preferred embodiment of the present invention has been described in detail in connection with the accompanying drawings, it is understood and to be noted that various changes as to form, use of materials and arrangement of parts may be made without departing from the spirit and scope of the present invention, as set forth in the appended claims.

We claim:
1. An optical density comparator, having a source of radiation which is discontinuous in the visible region of the spectrum, an optical system in the path of said radiation comprising a filter transmitting a selected narrow wavelength band component of said discontinuous radiation, an open aperture receptacle for a sample, an open aperture receptacle for a blank, said open aperture receptacle for a sample being mounted between two fixed sheets of polarizing material set for maximum transmission of radiation, said open aperture receptacle for a blank being mounted between a fixed sheet of polarizing material and a rotatable sheet of polarizing material, and indicating means for the degree of rotation of said rotatable sheet of polarizing material.

2. In an optical density comparator, the combination of a source of radiation which is discontinuous in the visible region of the spectrum and consists of spaced narrow wavelength bands, a colored filter in the path of said radiation which filter transmits a selected one of said narrow wavelength bands but absorbs all other components of visible radiation emitted by said source; the resulting radiation being substantially monochromatic, an optical system in the path of the radiation comprising an open aperture receptacle for a sample and an open aperture receptacle for a standard, the said receptacles being arranged in side by side relation whereby the sample and the standard may be visually compared; the said selected wavelength band being sufficiently narrow so as to avoid any substantial hue difference in said visual comparison of the sample and the standard, and means for measurably modulating the intensity of radiation emerging from one of the apertures.

DOROTHY M. DOLTON.
DANIEL SMITH.

REFERENCES CITED

The following references are of record in the file of this patent:

UNITED STATES PATENTS

| Number | Name | Date |
|---|---|---|
| 793,970 | Wanner | July 4, 1905 |
| 1,455,825 | Wood | May 22, 1923 |
| 1,551,843 | Nyswander | Sept. 1, 1925 |
| 2,068,301 | Nagel | Jan. 19, 1937 |
| 2,073,223 | Rose | Mar. 9, 1937 |
| 2,152,645 | Holven et al. | Apr. 4, 1939 |
| 2,221,170 | Richardson | Nov. 12, 1940 |
| 2,376,166 | Miller | May 15, 1945 |
| 2,386,878 | Nicherson | Oct. 16, 1945 |
| 2,396,260 | Gradisar et al. | Mar. 12, 1946 |
| 2,481,567 | Brown | Sept. 13, 1949 |

FOREIGN PATENTS

| Number | Country | Date |
|---|---|---|
| 894,581 | France | Mar. 20, 1944 |

OTHER REFERENCES

Publication, Davies et al., "Visual Photometer for the Measurement of Transmission and Reflection Densities," pages 128 to 136, The Photographic Journal, March 1935.